United States Patent
Allister

(10) Patent No.: US 6,709,771 B2
(45) Date of Patent: Mar. 23, 2004

(54) HYBRID SINGLE CRYSTAL-POWDER METALLURGY TURBINE COMPONENT

(75) Inventor: James Allister, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/155,257

(22) Filed: May 24, 2002

(65) Prior Publication Data

US 2003/0217792 A1 Nov. 27, 2003

(51) Int. Cl.⁷ .................................................. B22F 7/04
(52) U.S. Cl. .................... 428/680; 148/527; 148/562; 419/8
(58) Field of Search .................... 419/5, 8; 428/680; 148/527, 562

(56) References Cited

U.S. PATENT DOCUMENTS

| | | |
|---|---|---|
| 3,982,854 A | 9/1976 | Berry et al. |
| 4,137,619 A | 2/1979 | Beltran et al. |
| 4,270,256 A | 6/1981 | Ewing |
| 4,436,485 A | 3/1984 | Vonnegut |
| 4,529,452 A | 7/1985 | Walker |
| 4,772,450 A | 9/1988 | Friedman |
| 5,113,583 A * | 5/1992 | Jenkel et al. ............. 29/889.21 |
| 5,273,708 A * | 12/1993 | Freeman ........................ 419/35 |
| 5,561,827 A * | 10/1996 | Reeves et al. .................. 419/5 |
| 5,609,471 A * | 3/1997 | Frasier et al. ............ 416/204 A |
| 5,688,108 A * | 11/1997 | Dierksmeier et al. ... 416/213 R |
| 5,960,249 A * | 9/1999 | Ritter et al. ..................... 419/6 |
| 6,168,871 B1 | 1/2001 | Ritter et al. |
| 6,190,133 B1 | 2/2001 | Ress, Jr. et al. |
| 6,331,217 B1 | 12/2001 | Burke et al. |
| 2002/0197152 A1 * | 12/2002 | Jackson et al. ............. 415/115 |

* cited by examiner

*Primary Examiner*—George Wyszomierski

(57) ABSTRACT

A hybrid component (30) having a cast single crystal superalloy portion (32) and an attached powder metallurgy material portion (34). The component may be a blade (30) of a gas turbine engine having a single crystal airfoil section and a powder metallurgy material root section. The powder metallurgy material may extend to form a core (36) within the airfoil section and may include cooling passages 38. The single crystal portion has a relatively simple geometry so that casting yields are optimized. The powder metallurgical portion includes the lower stressed and more complicated geometry sections of the component. A method of forming such a component includes casting the single crystal superalloy portion, then using that portion to form part of the mold for forming the powder metallurgy material portion.

18 Claims, 2 Drawing Sheets

HYBRID SINGLE CRYSTAL-POWDER METALLURGY TURBINE COMPONENT

FIELD OF THE INVENTION

This invention relates generally to the field of power generation and more specifically to a component for a gas turbine engine, and in particular to a component formed of a single crystal superalloy material.

BACKGROUND OF THE INVENTION

Gas turbine engines include a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses; for example the combustor, the transition duct between the combustor and the turbine section, and the turbine stationary vanes, rotating blades and surrounding ring segments.

It is also known that increasing the firing temperature of the combustion gas may increase the power and efficiency of a combustion turbine. Modern high efficiency combustion turbines have firing temperatures that may be well in excess of the safe operating temperature of the structural materials used to fabricate the hot gas flow path components. Special superalloy materials have been developed for use in such high temperature environments, and these materials have been used with specific cooling arrangements, including film cooling, backside cooling and insulation. Superalloys are well known in the art. They are based on Group VIIIB elements and usually consist of various combinations of Fe, Ni, Co, and Cr, as well as lesser amounts of W, Mo, Ta, Nb, Ti, and Al. The three major classes of superalloys are nickel-based, iron-based, and cobalt-based alloys. Nickel-based superalloys can be either solid solution or precipitation strengthened. Solid solution strengthened alloys are used in applications requiring only modest strength. A precipitation-strengthened alloy is required in the most demanding applications such as the hot combustion gas flow path sections of gas turbine engines. The primary strengthening phase in nickel-based superalloys is $Ni_3(Al, Ti)$ and is termed gamma prime. A characteristic of the gamma prime strengthened nickel-based superalloys is that they retain their strength at elevated temperatures and may be used in load-bearing structures to the highest homologous temperature of any common alloy system (Tm=0.9, or 90% of their melting point).

Airfoil members such as blades and vanes formed of superalloy materials may be cast as monolithic structures with internal cooling channels being defined during the casting process by ceramic inserts. The inserts are later dissolved to create the open cooling channels within the cast component.

Single crystal superalloys offer improved mechanical properties and high temperature capabilities compared with conventionally cast components. However, it is very difficult to cast a large single crystal component without developing an unacceptable level of spurious grains and/or excessively large low angle boundaries. First-generation superalloys such as PWA 1483 contain no rhenium and are generally difficult to cast as a single crystal. Second-generation superalloys containing about 3 wt. % rhenium, for example PWA 1484 and CMSX-4, have been developed to obtain improved creep properties. The second generation superalloys are generally more difficult to cast than first-generation superalloys. Casting yields for large complex single crystal second generation superalloy turbine blades and vanes containing internal cooling passages may be no more than about 5–20%, making the use of such materials prohibitively expensive in many applications. Third-generation superalloys containing more than 3% and up to about 6% rhenium (for example CMSX-10) may be even more difficult to cast as complex single crystal turbine components.

One approach that has been used to facilitate the fabrication of complex single crystal shapes is described in U.S. Pat. No. 6,331,217. This approach involves casting a plurality of relatively simple single crystal sub-components, then joining the sub-components together with a transient liquid phase bonding process. The strength of the component at the bond location may be somewhat lower than the strength in pure single crystal castings, so the bond location is selected to be in an area of low stress. This approach has resulted in improved component yields; however, further improvements in fabrication techniques are desired.

U.S. Pat. No. 6,190,133 describes an airfoil component for the compressor section of a gas turbine engine. The airfoil component is formed of a equiaxed titanium alloy outer shell that is stiffened with an inner core member. The core member has a modulus of elasticity that is greater than that of the outer shell and may be titanium aluminide. The core member may be fabricated by a combination of machining, forging, casting and powder metallurgy techniques. The pre-formed core member is placed into an airfoil shaped mold and the outer shell is cast around the core member. The airfoil component and method of fabrication described in the '133 patent are used in the relatively cool compressor section of a gas turbine. Such components and methods of fabrication are not useful for gas turbine components that are exposed to the hot combustion gasses where temperatures may reach 1,600° C. or more.

SUMMARY OF THE INVENTION

Accordingly, an improved component and an improved method of manufacturing the component are needed for high temperature applications such as the hot combustion gas flow path of a gas turbine engine.

A hybrid blade for the hot gas pathway portion of a gas turbine engine is described herein as including: a cast single crystal superalloy portion comprising an outer surface defining an airfoil and an inner surface defining a cavity; and a superalloy powder metallurgy material portion comprising a core disposed within the cavity and a root extending beyond the cavity, the superalloy powder metallurgy material portion being metallurgically bonded to the cast single crystal superalloy portion along the inner surface. The hybrid blade may further include a cooling passage formed through the superalloy powder metallurgy material portion.

A hybrid component is described herein as including: a first portion comprising a cast single crystal material; and a second portion comprising a powder metallurgy material. The second portion may be a relatively complex shape compared to the first portion. The second portion may be subjected to a lower level of stress than the first portion during use of the component. The first portion may be a cast single crystal superalloy material, and there may be a metallurgical bond between the first portion and the second portion. The first portion may be a cast single crystal superalloy material comprising at least 3 wt. % rhenium.

A method of fabricating a hybrid component is described herein as including the steps of: forming a first portion comprising a cast single crystal material; and forming a second portion comprising a powder metallurgy material. The method may include: casting the first portion to comprise an airfoil having a hollow center; and using the airfoil as a mold for at least partially containing powder during the step of forming a second portion. A melting point suppressant material may be applied to a bond surface of the first portion to facilitate the formation of a metallurgical bond between the first portion and the second portion along the bond surface. The method may further include forming the first portion to be an airfoil section and forming the second portion to be a root section attached to the airfoil section.

BRIEF DESCRIPTION OF THE DRAWINGS

These and other advantages of the invention will be more apparent from the following description in view of the drawings that show.

DETAILED DESCRIPTION OF THE INVENTION

Figure 1:
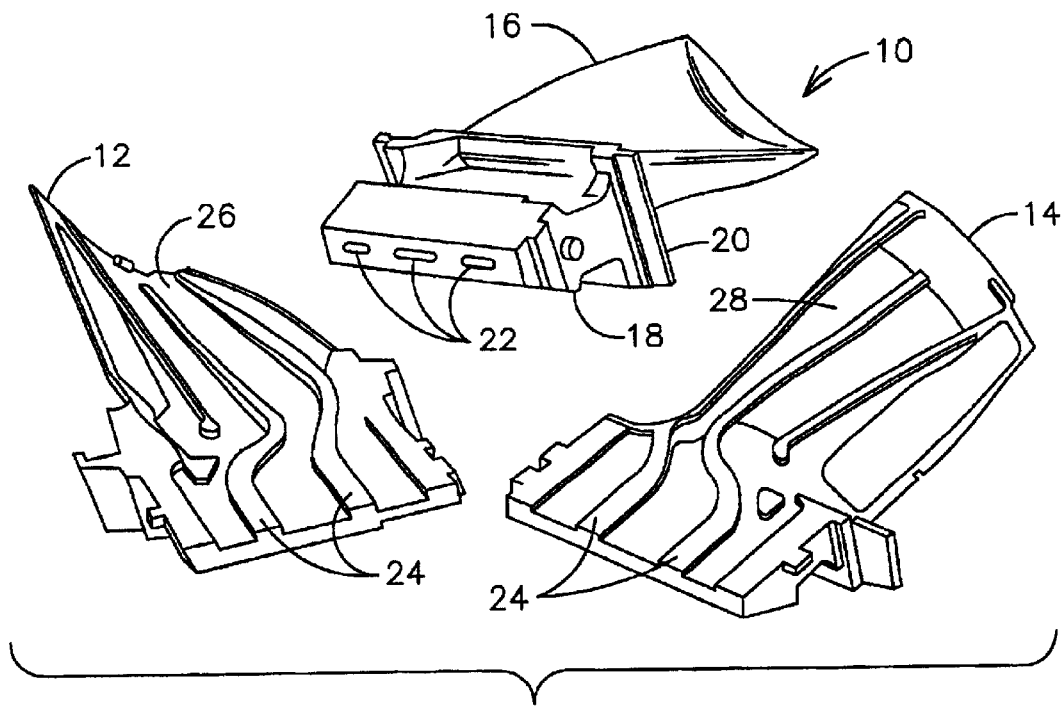
FIG. 1 is an isometric view of sectioned gas turbine blade halves and a bonded turbine blade in accordance with the prior art.

A prior art gas turbine blade 10 is illustrated in FIG. 1 along with its respective sectioned halves 12, 14. Rotating blades typically include an airfoil section 16 and a root section 18 including a platform 20. Stationary vanes (not shown) typically include a central airfoil section and two shrouds on opposed ends of the airfoil section. The platform 20 of rotating blade 10 may be considered equivalent to a shroud of a stationary vane. Land-based power generation gas turbine engines may include relatively large blades, having a total length of 12–18 inches and weighing 20–30 pounds. Blade 10 includes a plurality of internal cooling channels 22 defined by ligaments 24 formed between opposed airfoil walls 26,28 of the airfoil section 16. Casting of such a blade 10 as a monolithic single crystal superalloy component may result in unacceptably low yields due to the difficulties of controlling the thermal energy removal from such a complex and heavy structure.

Figure 2:
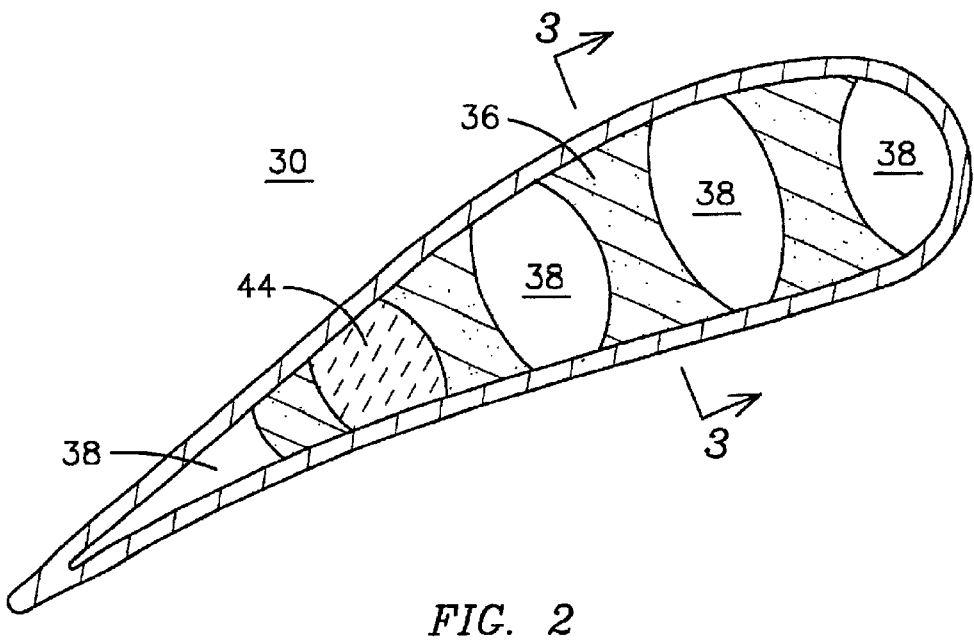
FIG. 2 is a cross-sectional view of the airfoil section of a composite gas turbine blade having a cast single crystal superalloy airfoil section and a powder metallurgy core containing cooling passages within the airfoil section, with one of the cooling passages being illustrated at a stage of fabrication wherein a ceramic insert is disposed within the core.
Figure 3:
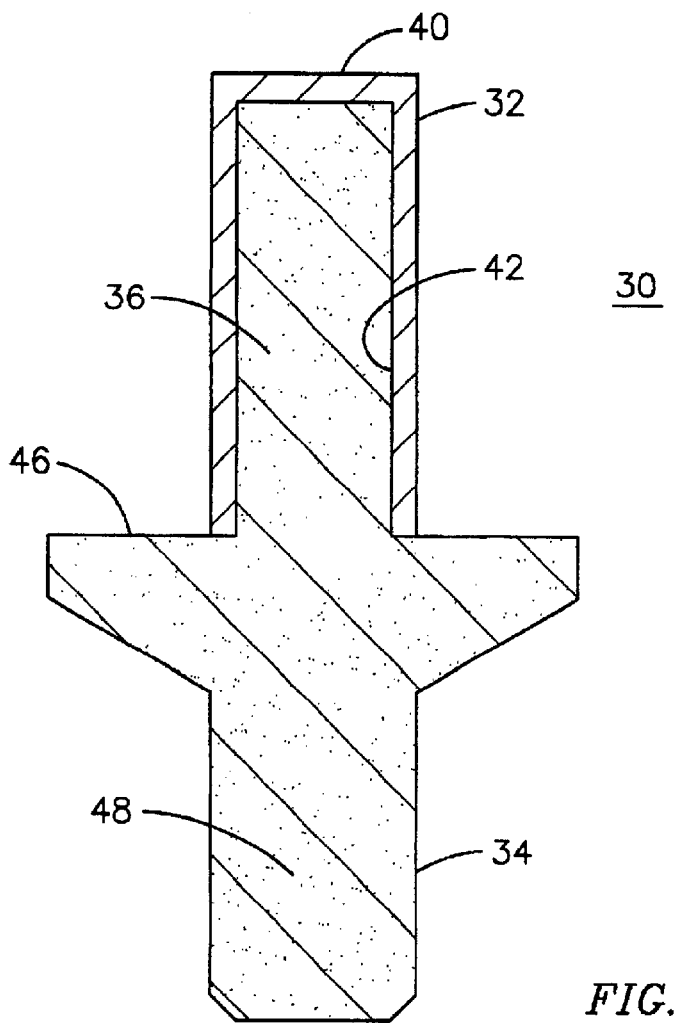
FIG. 3 is a cross-sectional view of the composite gas turbine blade of FIG. 2 as viewed along section 3—3.

FIGS. 2 and 3 illustrate a gas turbine blade 30 having a composite structure including a cast single crystal airfoil section 32 and a powder metallurgy material root section 34. The powder metallurgy material extends from the root section 34 to form a core 36 including a plurality of internal cooling passages 38. While the overall blade 30 defines a complex geometry, the airfoil section 32 is a relatively simple and lightweight shape compared to the relatively more complex root section 34 and core 36.

The relatively simple cross-sectional shape of the airfoil section 36 may be formed as a single crystal structure by casting a superalloy material, for example CMSX-4, using a conventional high thermal gradient single crystal casting technique. In the embodiment of FIG. 3 where airfoil section 32 includes an end cap 40, the single crystal material may be grown from the root end of the airfoil section 32 toward the end cap. This direction of crystal growth ensures that the change in cross-section at the end cap 40 does not affect the crystal growth along the majority of the length of the dendrite.

Once the airfoil section 32 has been successfully cast as a single crystal structure having a generally hollow center, it may form part of the mold used to fabricate the powder metallurgy material to form a second portion of the blade 30 including the root section 34 and core 36. A powder such as superalloy powder U720Li is added to the assembly to fill the hollow center of the airfoil section 32 and to fill a mold (not shown) defining the root section 34. Mechanical vibration may be used to ensure complete filling and to aid full densification of the final product. The assembly is then heated to sinter the powder and to ensure good bonding between the powder and the single crystal airfoil material. Hot isostatic pressing (HIP) may be employed to aid full densification of the powder. Since densification of the powder is performed at a relatively low temperature (for example approximately 200° C. below the gamma prime solvus temperature of the single crystal material, it is possible to retain the desired single crystal structure in the airfoil section 32 by avoiding recrystallization. If desired, the internal surface 42 of the airfoil section 32 defining the hollow center may be coated with an agent such as a melting point suppressant to enhance the formation of a metallurgical bond between the powder and the single crystal material along the surface 42. Melting point suppressants are commercially available as boron-containing foil and paste.

The cooling passages 38 may be formed within the powder metallurgy material by positioning a ceramic insert 44 within the hollow airfoil section 32 prior to filling it with powder. The ceramic insert 44 is later dissolved to leave a void defining the cooling passage 38 once the powder has been at least partially densified. FIG. 2 illustrates one cooling passage during a stage of fabrication wherein the ceramic insert 44 is in position within the powder metallurgy material, and also illustrates cooling passages 38 as they would appear in the final product after respective ceramic inserts have been dissolved.

Figure 4:
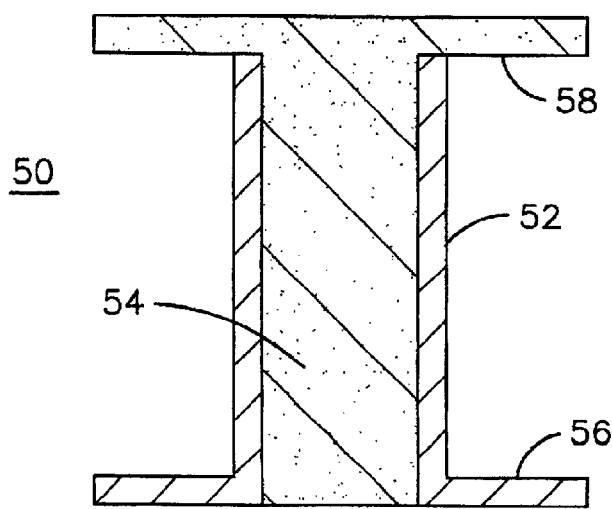
FIG. 4 is a cross-sectional view of a composite gas turbine vane having a cast single crystal superalloy airfoil section with a powder metallurgy core and illustrating two alternative embodiments for forming the shrouds of the vane.

FIG. 4 illustrates a cross-sectional view of a gas turbine vane 50 including a cast single crystal superalloy airfoil section 52 and a powder metallurgy material core 54. Vane 50 has two shrouds 56, 58 formed on opposed ends of the airfoil section 52. Shroud 56 is illustrated as being integrally cast with the single crystal airfoil section 52. Such a casting may be done by controlled cooling to promote a single crystal growth beginning on the end away from the shroud 56. In this manner, the change in cross-section at the shroud 56 does not affect the dendrite growth along the length of the airfoil section 52. Shroud 58 is formed of powder metallurgy material and is integral with core 54. An alloy powder selected to provide a coefficient of thermal expansion matched to that of the single crystal material is introduced into the hollow center of the airfoil section 52 and into a mold (not shown) that defines the shroud 58. Fugitive inserts may be used to define cooling passages (not shown) or other voids within the powder metallurgy material. The powder is then densified to form the composite vane 50.

One may appreciate that the method of fabrication described above may be used to form a complex component including single crystal material in a first portion of the component where the improved material properties of a single crystal material are needed, such as in an area exposed to very high peak temperature, an especially high stress or a highly corrosive environment. The first portion of the component is chosen to have a relatively simple geometry when compared to other portions of the component or the component as a whole. The relatively simple geometry will facilitate the casting of the first portion as a single crystal with a reduced rejection rate when compared to casting a more complicated geometry. The relatively simple geometry may be successfully cast as a single crystal structure with a superalloy material containing 3% rhenium or more. A second portion of the component having a shape that is more complex than the first portion may be formed from a powder metallurgy material. The second portion of the component is selected to include areas that are less demanding on the material properties, i.e. areas having a surface exposed to a lower temperature, lower stress regions, or surfaces exposed to a less corrosive environment. The powder metallurgy material may be less dense than the single crystal material, thus reducing the overall weight of the component when compared to the same structure cast entirely from the single crystal material. Typically the density difference between cast single crystal material and powder metallurgy material is 5–8%; for example, CMSX-4 is 8.72 $gcm^3$ and IN738 is 8.1 $g/cm^3$.

The powder used to form the powder metallurgy portion of a composite component need not have a consistent composition throughout its volume. One section of the component may be formed of powder specially selected for a particular property. For example a particularly corrosion resistant composition may be used in a section 46 proximate a surface exposed to a corrosive environment, and a particularly strong composition may be used in a section 48 of high stress. Any number of different compositions may be used in a single component, and the change from one composition to another composition may be blended gradually from one section to another.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A hybrid blade for the hot gas pathway portion of a gas turbine engine, the hybrid blade comprising:
    a cast single crystal superalloy portion comprising an outer surface defining an airfoil and an inner surface defining a cavity; and
    a superalloy powder metallurgy material portion comprising a core disposed within the cavity and a root extending beyond the cavity, the superalloy powder metallurgy material portion being metallurgically bonded to the cast single crystal superalloy portion along the inner surface.

2. The hybrid blade of claim 1, further comprising a cooling passage formed through the superalloy powder metallurgy material portion.

3. The hybrid blade of claim 1, further comprising a fugitive insert disposed within the superalloy powder metallurgy material portion.

4. A method of fabricating a hybrid component, the method comprising:
    forming a first portion comprising a cast single crystal material; and
    using the first portion as at least part of a mold for forming a second portion comprising a powder metallurgy material, the powder metallurgy material becoming bonded to the cast single crystal material during densification of the powder metallurgy material.

5. The method of claim 4, further comprising:
    casting the first portion to comprise an airfoil having a hollow center; and
    using the airfoil as a mold for at least partially containing powder during the step of forming a second portion.

6. The method of claim 4, further comprising:
    applying a melting point suppressant material to a bond surface of the first portion; and
    forming a metallurgical bond between the first portion and the second portion along the bond surface.

7. The method of claim 4, further comprising forming the second portion to comprise a relatively complex shape compared to the first portion.

8. The method of claim 4, further comprising forming the second portion in a section of the component subjected to a lower level of stress than the first portion during use of the component.

9. The method of claim 4, further comprising forming the first portion of a cast single crystal superalloy material.

10. The method of claim 4, further comprising forming the first portion to comprise an airfoil section and forming the second portion to comprise a root section attached to the airfoil section.

11. The method of claim 4, further comprising forming the second portion to comprise a core for the airfoil section.

12. The method of claim 4, further comprising forming a cooling passage in the second portion.

13. The method of claim 4, further comprising forming the first portion to comprise an airfoil section and forming the second portion to comprise a shroud attached to the airfoil section.

14. The method of claim 4, further comprising forming the first portion of a cast single crystal superalloy material comprising at least 3 wt. % rhenium.

15. The method of claim 4, further comprising forming the second portion to comprise a first composition of powder in a first section of the second portion and a second composition of powder in a second section of the second portion.

16. The method of claim 4, further comprising selecting the first portion to include a surface exposed to a first peak temperature during use of the component and selecting the second portion to include a surface exposed to a second peak temperature during use of the component, the first peak temperature being higher than the second peak temperature.

17. The method of claim 4, further comprising:
    disposing a ceramic insert within a powder used to form the second portion during the step of forming the second portion; and dissolving the ceramic insert to define a cooling passage through the second portion.

18. The method of claim 4, further comprising densifying the powder metallurgy material at a temperature below a gamma prime solvus temperature of the cast single crystal material.

\* \* \* \* \*